(12) United States Patent
Levine

(10) Patent No.: US 6,307,577 B1
(45) Date of Patent: Oct. 23, 2001

(54) CHART RECORDER WITH SINGLE ACTUATOR FOR PAPER AND PEN MOVEMENTS

(76) Inventor: Matthew Levine, 7040 NW. 68th Dr., Parkland, FL (US) 33067

(*) Notice: Subject to any disclaimer, the term of this patent is extended or adjusted under 35 U.S.C. 154(b) by 0 days.

(21) Appl. No.: 09/219,675

(22) Filed: Dec. 23, 1998

Related U.S. Application Data
(60) Provisional application No. 60/070,135, filed on Dec. 31, 1997.

(51) Int. Cl.$^7$ .................................................. G01D 15/16
(52) U.S. Cl. ............................. 346/113; 346/112; 400/185
(58) Field of Search ................................... 346/112, 113, 346/137, 121, 123, 124, 139 R; 400/902, 903, 185

(56) References Cited

U.S. PATENT DOCUMENTS
3,573,843 * 4/1971 Solley ..................................... 346/34
3,845,850 * 11/1974 Herr et al. ....................... 400/120.16

FOREIGN PATENT DOCUMENTS
2052063A * 1/1981 (GB) .

* cited by examiner

Primary Examiner—John Barlow
Assistant Examiner—Blaise Mouttet
(74) Attorney, Agent, or Firm—Gifford, Krass, Groh, Sprinkle, Anderson & Citkowski, PC

(57) ABSTRACT

A single actuator moves the chart and the marking implement in a chart recorder. A first drive means is used for advancing the chart to be recorded upon, a second drive means is used to move the marking implement, and an electromechanical actuator, responsive to an input signal, coupled to both the first and second drive means, exhibits a first direction of movement causing the marking implement to move and the chart to advance, and a second direction of movement causing only the marking implement to move. The electromechanical actuator preferably takes the form of a bidirectional stepper motor, though other types of motors and actuators such as solenoids may alternatively be utilized. Although useful with other types of chart recorders such as strip-chart recorders, the invention is particularly well suited to circular charts, since the shaft of the motor may be coupled to the chart movement mechanism by way of a rotatable disk. A second rotatable disk may be coupled to the same shaft to move the marking implement, typically a pen supported on a pivoting arm though the invention is not restricted in this regard. A ratcheting mechanism is used to ensure that the chart advances in a single direction. Methods of operation are also disclosed.

10 Claims, 3 Drawing Sheets

CHART RECORDER WITH SINGLE ACTUATOR FOR PAPER AND PEN MOVEMENTS

REFERENCE TO RELATED APPLICATION

This application claims priority of U.S. provisional application Ser. No. 60/070,135, filed Dec. 31, 1997, the entire contents of which are incorporated herein by reference.

FIELD OF THE INVENTION

This invention relates generally to chart recorders and, in particular, to a recorder wherein a single motor or other actuator is used to advance the chart paper and move the pen or other marking implement(s).

BACKGROUND OF THE INVENTION

Chart recorders such as circular chart recorders have evolved from the use of purely mechanical configurations to low-voltage electronic versions. In units manufactured by CoBex, Inc., for example, an individual stepper motor is used to advance the chart paper, with another stepper motor being used for pen movements. Although the use of separate electromechanical actuators offers advantages in terms of functionality, the stepper motors are, also, one of the most expensive components of the chart recorder system. Accordingly, any arrangement which might make better use of a stepper motor or combine electromechanical functions into a single actuator would be of economic benefit.

SUMMARY OF THE INVENTION

The present invention improves upon the prior art by providing a chart recorder apparatus wherein a single actuator is employed to move the chart and a marking implement, thereby alleviating the expense of an additional actuator. In a preferred embodiment, apparatus according to the invention includes first drive means for advancing the chart to be recorded upon, second drive means for moving the marking implement, and an electromechanical actuator coupled to both the first and second drive means, the actuator having a first direction of movement causing the marking implement to move and the chart to advance, and a second direction of movement causing only the marking implement to move.

In the preferred embodiment the electromechanical actuator takes the form of a bidirectional stepper motor, though other types of motors and actuators such as solenoids may alternatively be utilized. In addition, though useful with other types of chart recorders such as strip-chart recorders, the invention is particularly well suited to circular charts, since the shaft of the motor may be coupled to the chart movement mechanism by way of a rotatable disk. A second rotatable disk may be coupled to the same shaft to move the marking implement, typically a pen supported on a pivoting arm though the invention is not restricted in this regard. In this embodiment, a ratcheting mechanism is used to ensure that the chart advances in a single direction.

DESCRIPTION OF THE INVENTION

The present invention improves upon existing chart recorder systems by utilizing the same actuator both to advance the chart paper and to move the pen or other marking implement(s). In the preferred embodiment, a single stepper motor is used for both purposes, though the invention anticipates the use of any single electromechanical actuator, including solenoids and other types of motors, for such a purpose. In addition, although the following discussion focuses on the use of a single or other actuator for chart advancement and the movement of a single marking implement, it will become apparent to one of skill in the art that extensions to the basic mechanisms disclosed herein may be used to advance a chart while controlling the movement of multiple marking implements, such as different colored marking pens, and so forth. Broadly, so long as chart movement is incremented even on a periodic basis so as to reflect accurate data recordings, the motor or other actuator may be used according to the invention may be freed up to perform other mechanical movements through appropriate coupling(s).

Figure 1:
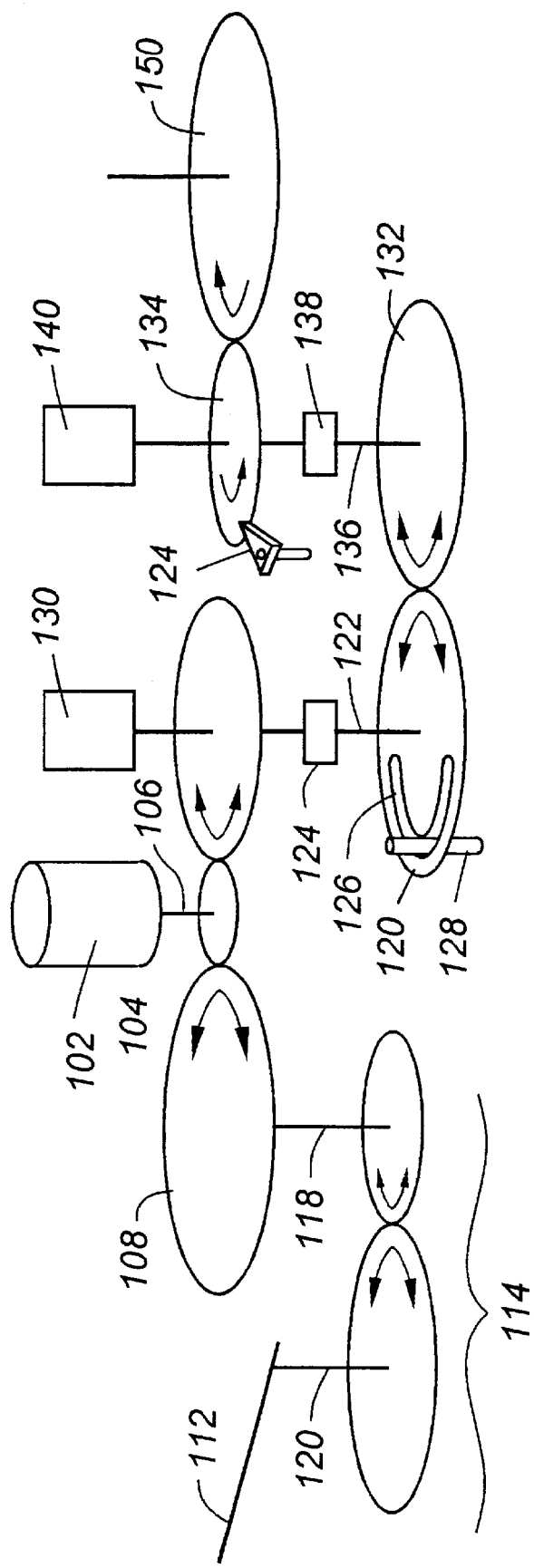
FIG. 1 illustrates, from an oblique perspective, a drive mechanism for a single motor circular chart recorder according to the invention.

Referring to FIG. 1, there is shown from an oblique perspective, a drive mechanism for a single motor chart recorder according to the invention. The motor 102, which moves in bidirectional fashion, is coupled to drive disks 104 and 110 through shaft 106. The drive disk 104, in turn, is coupled to a pen drive disk 108 and ultimately to a pen arm, 112 by way of a pair of transfer disks 114 through shafts 118 and 220, respectively.

The chart drive disk 110 is coupled to a restricted movement disk 120 through a shaft 122 including a spacer 124. The restricted movement disk 120 includes an annular slot 126 and a stop pin 128 restricting the rotational and counter-rotational movement of the disk 120 to a predetermined number of degrees in both directions as evident from the drawing. The spacer 124 and a friction component 130 enable the chart driven disk 110 to turn in either direction despite the fact that the restricted movement disk 120 may have stopped due to the stop pine 128.

The disk 120 is coupled to a disk 132 which drives a ratcheting disk 136 through a shaft and spacer 136 and 138, respectively. The shaft 136 continues upwardly through the disk 134 and into a second friction component 140. The disk 134, which can move only in one direction by virtue of a one-way ratchet 142, drives a disk 150 onto which the chart is placed, for movement in only a single direction as well. As with the spacer 124 and friction component 130, the spacer 138 and friction component 140 enable the disk 132 to turn in either direction while a one-way ratchet restricts the rotation of disk 134 to a single direction, as shown.

In operation, the motor 102 is able to drive the pen 112 in either direction, without restriction, as shown, by virtue of the coupling through disks 104, 108 and 114. Indeed, this aspect of the mechanism may be quite similar to that currently in use with systems wherein a pen is independently controlled by its own motor or other actuator.

Figure 2:
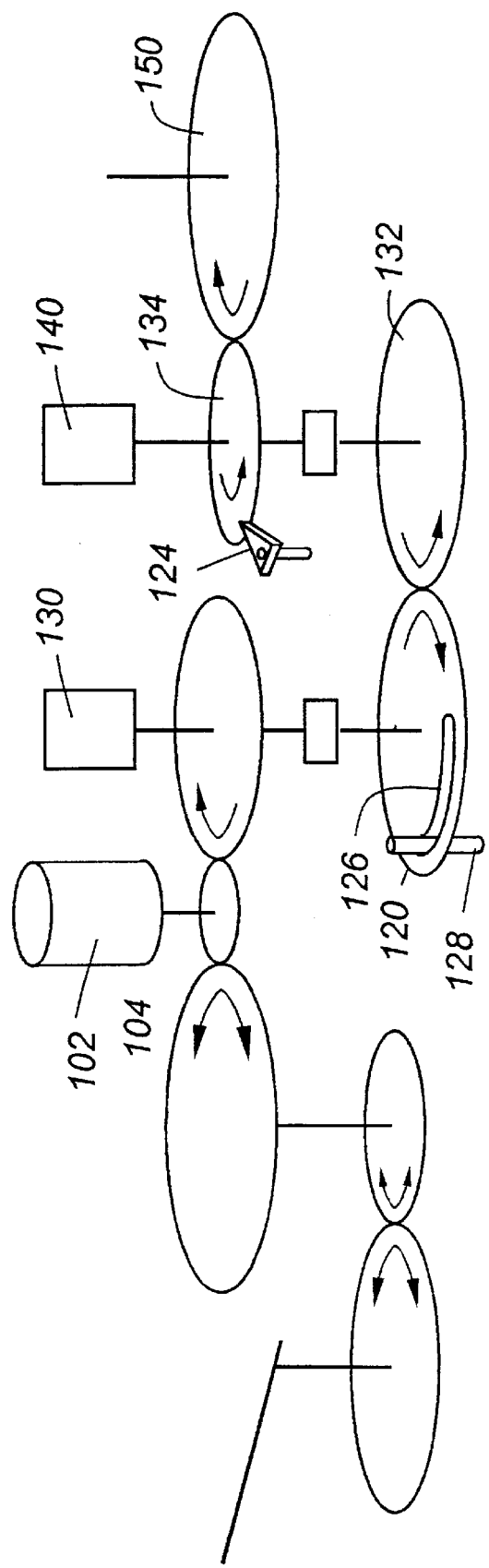
FIG. 2 illustrates how, when the motor of FIG. 1 twice changes direction, the chart advances by one time increment.

As shown in FIG. 2, if a previous rotation of disk 104 and disk 110 has resulted in the rotation of restricted movement disk 120 to cause a stop in movement as shown, further rotation of disk 104 in the same direction will have no affect of the movement of chart 150. If, however, the rotation of motor 102 changes direction, disk 102 will be allowed to rotate in a clockwise fashion, as will disk 120, causing rotation of the disk 120 until the stop pin reaches the other end of the slot 126.

During this partial rotation of disk 120, however, disk 132 will be allowed to rotate in a counter-clockwise fashion, as will disk 134, resulting in a ratcheting by one-way ratchet 142, and in rotational increment in the travel of circular chart paper 150. Should the rotation of motor 102 continue in a counter-clockwise fashion, as shown, no further movements in the chart 150 will take place by virtue of the stop pin 128. Even if the motor 102 changes direction, there will still be no further movement of chart paper 150, since, although disk 120 will rotate to its other stop position, disk 132 will rotate, but disk 134 will not due to the action of the one-way ratchet 142.

If, however, the motor changes direction twice, that is, with respect to FIG. 2, from a counter-clockwise direction to a clockwise direction and back again, then, and only then, will the chart 150 be once again rotationally increment using the same motor 102. Thus, according to this invention, so long as the disk 104 driven by motor 102 is forced to change rotational direction during a specified time interval, the chart paper will advance correctly, as though driven by its own actuator.

Figure 3:
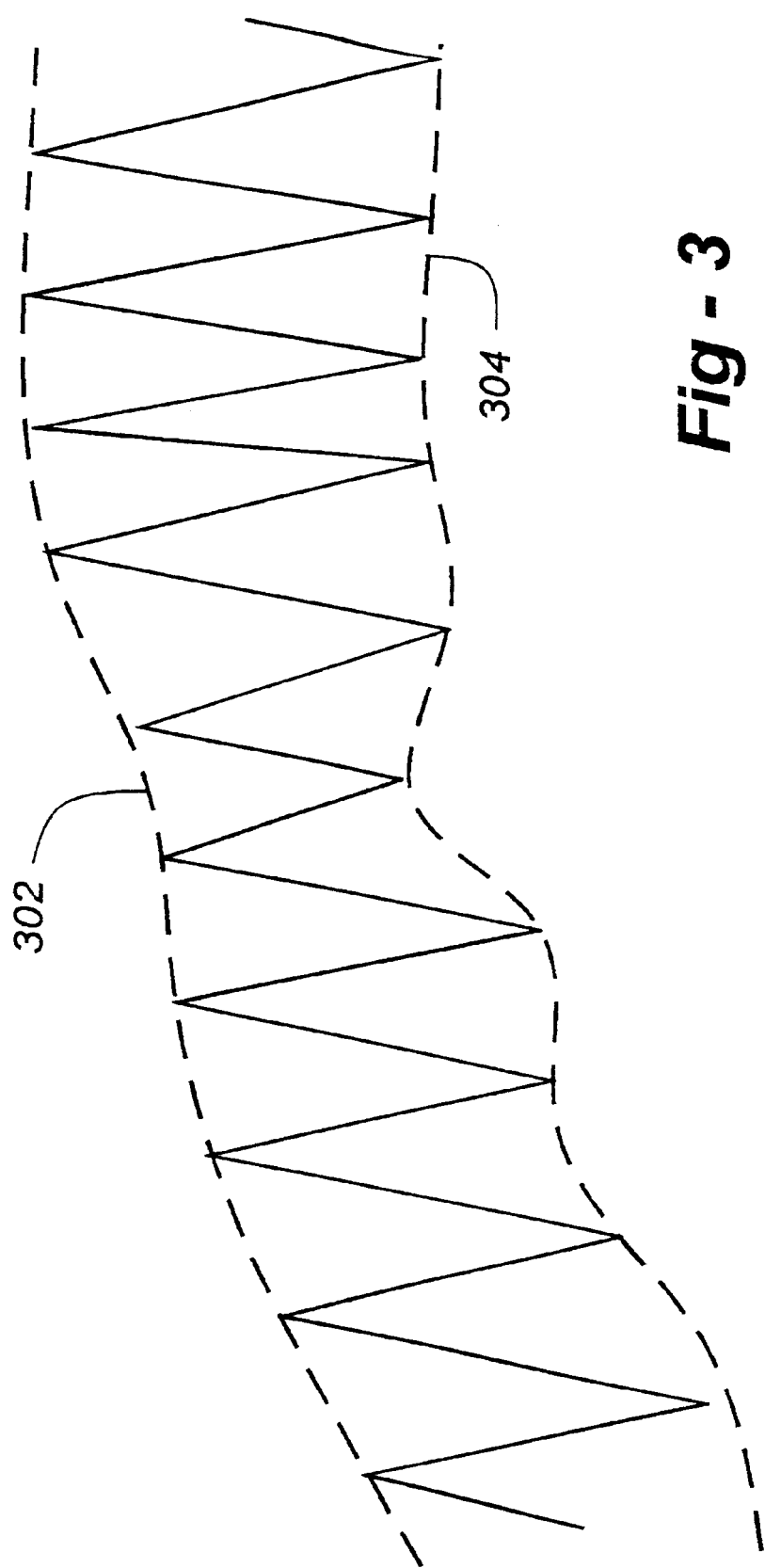
FIG. 3 shows how, since upper and lower values are recorded during a typical recording session, a single actuator may conveniently be utilized in accordance with the inventive principles as disclosed.

Moreover, since, as shown in FIG. 3, in order to record upper and lower value 302 and 304, respectively, during a typical recording session, the pen movement automatically goes through a reversal in movement upon each time interval, which may then conveniently be taken advantage of for paper movement according to the invention. Even in the unlikely event that a reversal in recording implement direction does not take place during a particular time interval, the system, being microprocessor-based, may automatically force a pen reversal during an instantaneous point in time so as to create a radial marking (on circular chart paper) or a sufficiently small indicator so as to not to interfere with the recording process.

Certain things will be evident to one of skill based upon this disclosure. Firstly, although a certain number of disks are shown in FIGS. 1 and 2 for drive purposes, more or fewer such disks may be used, depending upon the mechanical configuration. For example, pen 112 might be driven directly from disk 108 if a rotational increase or decrease is not required. Similar adjustments may be made to the paper-drive portion of the apparatus. Indeed, the invention is applicable to other types of drive means such as pulleys, and so forth, as well as to the movement of linear (i.e., non-rotational) chart paper so long as the overlying goal of the invention is realized, namely, that a single electromechanical actuator such as a motor is used both to make marks on the paper and to drive the paper itself.

What is claimed is:

1. Chart recorder apparatus, comprising:

first drive means for advancing a chart to be recorded upon;

second drive means for moving an implement to place a marking on the chart; and an electromechanical actuator having a bidirectionally rotatable shaft coupled to both the first and second drive means, the actuator having a first direction of rotation causing the marking implement to move and the chart to advance, and a second direction of rotation causing only the marking implement to move.

2. The chart recorder apparatus of claim 1, wherein the chart is a circular chart.

3. The chart recorder apparatus of claim 1, wherein the chart is a strip chart.

4. The chart recorder apparatus of claim 1, wherein the electromechanical actuator is a solenoid.

5. The chart recorder apparatus of claim 1, wherein the electromechanical actuator is a stepper motor.

6. The chart recorder apparatus of claim 5, further comprising:

a rotatable disk coupling the shaft to the first drive means; and a ratcheting mechanism preventing the disk from rotating in both directions.

7. The chart recorder apparatus of claim 6, further including a second rotatable disk coupling the shaft to the second drive means.

8. Chart recorder apparatus, comprising:

an input for receiving a signal to be recorded;

a motor having a bidirectionally rotatable shaft, the movement of which is controllable as a function of the input signal;

a marking pen on a pivot arm coupled to the rotatable shaft, enabling the pen to pivot back and forth as the movement of the motor is controlled;

a circular chart rotation mechanism coupled to the rotatable shaft through a rotatable disk; and a ratcheting mechanism causing the chart to rotate in a single direction.

9. The chart recorder apparatus of claim 8, wherein the motor is a stepper motor.

10. The chart recorder apparatus of claim 8, further including a second rotatable disk coupling the shaft to the marking pen on the pivot arm.

\* \* \* \* \*